(12) United States Patent  
Chiang

(10) Patent No.: US 8,436,719 B2  
(45) Date of Patent: May 7, 2013

(54) NETWORK DEVICE

(75) Inventor: Kuo-Wei Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 751 days.

(21) Appl. No.: 12/582,804

(22) Filed: Oct. 21, 2009

(65) Prior Publication Data

US 2011/0032083 A1     Feb. 10, 2011

(30) Foreign Application Priority Data

Aug. 7, 2009   (CN) .......................... 2009 2 0307620

(51) Int. Cl.
*G08B 9/00* (2006.01)
(52) U.S. Cl.
USPC ................ 340/286.02; 455/13.4; 455/127.1; 455/127.5
(58) Field of Classification Search .............. 340/286.02
See application file for complete search history.

(56) References Cited

U.S. PATENT DOCUMENTS

| | | | |
|---|---|---|---|
| 6,222,746 B1 * | 4/2001 | Kim | 363/89 |
| 6,996,124 B1 * | 2/2006 | Chow | 370/466 |
| 7,804,859 B2 * | 9/2010 | Landry et al. | 370/535 |
| 2009/0011706 A1 * | 1/2009 | Wilson et al. | 455/41.1 |
| 2009/0034788 A1 * | 2/2009 | Sim et al. | 382/100 |

* cited by examiner

*Primary Examiner* — George Bugg  
*Assistant Examiner* — Anthony D Afrifa-Kyei  
(74) *Attorney, Agent, or Firm* — Altis Law Group, Inc.

(57) ABSTRACT

A network device includes a status displaying module, a network module, a processor, a power providing module, and a power saving circuit. The network module implements network functions of the network device. The status displaying module receives displaying signals from the network module. The processor directs the network module to implement the network functions. The power providing module provides power for the processor, the network module, and the status displaying module. The power saving circuit couples the displaying signals to obtain coupled signals and controls modes of the processor and the power providing module according to presence of the coupled signals.

10 Claims, 2 Drawing Sheets

NETWORK DEVICE

BACKGROUND

1. Technical Field

Embodiments of the present disclosure relate to a network device, and more particularly to a power saving circuit utilized in the network device.

2. Description of Related Art

Network devices, such as routers and modems, are widely used in home data networks for accessing and browsing the Internet. The network devices rarely continuously process and transmit data since Internet access practices are intermittent. Each network device includes a processor and a power providing module for processing the data.

However, even when the network devices stop processing and transmitting data, internal hardware and software in the network devices are continuously processing or preparing to process and transmit data, which consequently wastes power. In addition, due to the large number of such network devices, the power waste caused by the internal hardware and software of the network devices are considerable. Therefore, there remains a heretofore unaddressed need to overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

Figure 1:
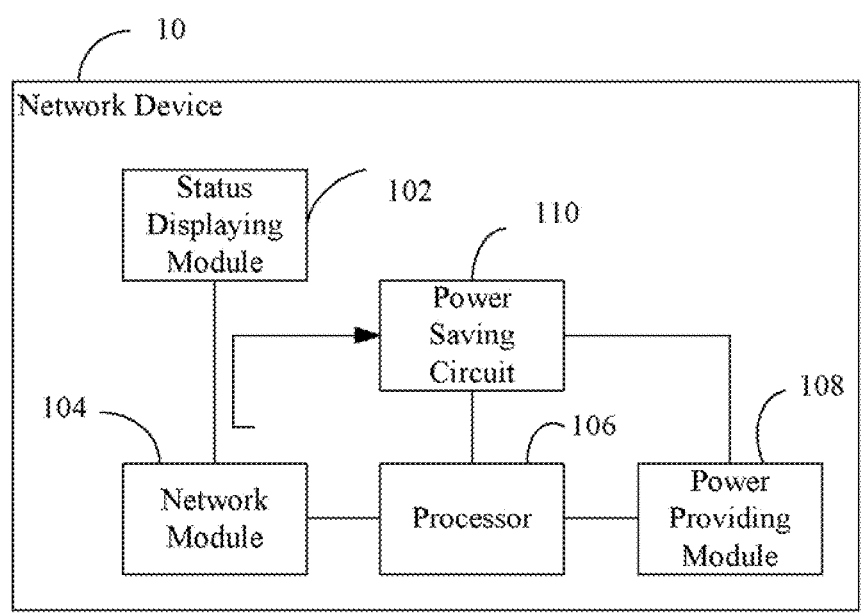
FIG. 1 is a schematic diagram of functional modules of one embodiment of a network device of the present disclosure.

FIG. 1 is a schematic diagram of one embodiment of a network device 10. The network device 10 implements network functions, such as processing and transmitting data for accessing and browsing the Internet. The network device 10 further changes modes of a processor 106 and the functional modules of the network device for conservation of power. In one embodiment, the modes include sleep mode and working mode. The network device 10 may be a router, a modem, or a gateway.

The network device 10 includes a status displaying module 102, a network module 104, a processor 106, a power providing module 108, and a power saving circuit 110. The modules 102, 104, 106, 108 may comprise one or more computerized instructions which may be executed by the processor 106. Further description of the modules 102, 104, 106, 108 in conjunction with the network device 10 will be explained below.

The network module 104 is operable to implement network functions of the network device 10, such as routing. In one embodiment, the network module 104 may be a physical layer of the Ethernet standard and operable to transmit network data.

The status displaying module 102 is operable to receive displaying signals from the network module 104 to indicate operating status of the network device 10. In one embodiment, the status displaying module 102 may be light emitting diode (LED) lamps. Commonly, the network device 10 includes a plurality of LED lamps and consequently there may be a plurality of displaying signal transmission lines connecting the network module 104 and the status displaying module 102.

The network module 104 sends the displaying signals to the status displaying module 102 upon the condition that the network module 104 implements network functions. The status displaying module 102 indicates the operating status of the network device 10 according to the displaying signals. Conversely, the status displaying module 102 receives no displaying signals upon the condition that the network module 104 stops implementing network functions.

The processor 106 is operable to direct the network module 104 to implement the network functions. In one embodiment, the processor 106 may be a CPU of the network device 10.

The power providing module 108 is operable to provide power for the processor 106, the network module 104, and the status displaying module 102. Commonly, the network device 10 conserves power when the processor 106 and the power providing module 108 are both in sleep mode.

The power saving circuit 110 is coupled to the plurality of displaying signal transmission lines connecting the network module 104 and the status displaying module 102 and operable to couple the displaying signals transmitted to the status displaying module 102 from the network module 104 to obtain coupled signals. The power saving circuit 110 acquires the coupled signals if the network module 104 transmits the displaying signals to the status displaying module 102. Conversely, the power saving circuit 110 acquires no coupled signals if the network module 104 stops transmitting the displaying signals to the status displaying module 102.

The power saving circuit 110 is further operable to control modes of the processor 106 and the power providing module 108 according to the coupled signals. In one embodiment, the power saving circuit 110 directs the processor 106 and the power providing module 108 to enter working mode upon the condition that the coupled signals exist. Conversely, the power saving circuit 110 directs the processor 106 and the power providing module 108 to enter sleep mode upon the condition that the coupled signals do not exist, which conserves power of the network device 10.

Figure 2:
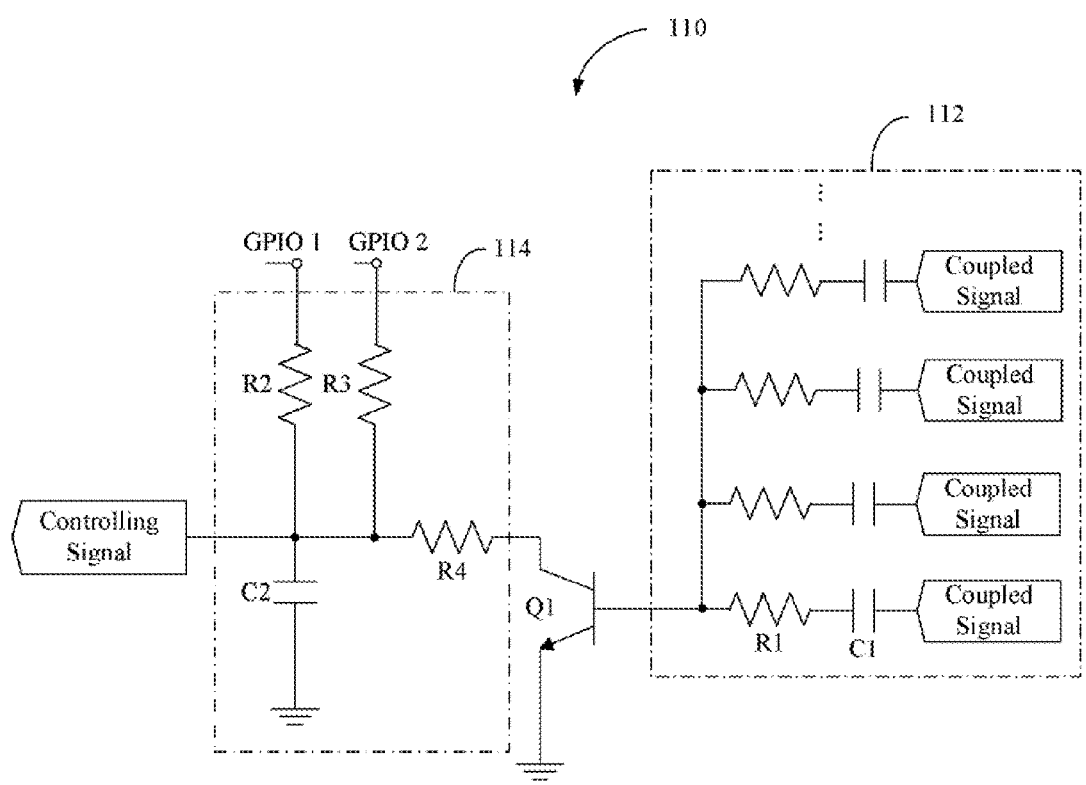
FIG. 2 is a schematic diagram of a power saving circuit of the network device in FIG. 1.

FIG. 2 is a schematic diagram a power saving circuit 110 of the network device 10 of FIG. 1.

In one embodiment, the power saving circuit 110 includes a transistor Q1, a signal inputting module 112, and a voltage dividing module 114.

The signal inputting module 112 is operable to input the coupled signals. In one embodiment, the signal inputting module 112 includes a plurality of signal inputting lines respectively coupled to the plurality of displaying signal transmission lines connecting the network module 104 and the status displaying module 102. The coupled signals exist upon the condition that signals are present in any one of the signal inputting lines. In one embodiment, each signal inputting line includes an input capacitor C1 and an input resistor R1. The input capacitor C1 and the input resistor R1 are connected in series so as to input the coupled signals to the base of the transistor Q1.

The base of the transistor Q1 is connected to the signal inputting module 112. The collector of the transistor Q1 is connected to the voltage dividing module 114. The emitter of the transistor Q1 is connected to the ground. The transistor Q1 is turned on or off according to the coupled signals input to the base of the transistor Q1. In one embodiment, if display signals are present in any one of the displaying signal transmission lines, the coupled signals exist and consequently the transistor Q1 is on. Conversely, if there are no displaying signals in any of the displaying signal transmission lines, the coupled signals do not exist and consequently the transistor Q1 is off.

The voltage dividing module 114 receives logic signals from general purpose input output (GPIO) ports of the network device 10. The voltage dividing module 114 is operable to output a controlling signal according to the transistor Q1 and the logic signals so as to control modes of the processor 106 and the power providing module 108. In one embodiment, the logic signals of the GPIO ports may be generated by the processor 106 or by an external switch (not shown). In one embodiment, if the controlling signal is low level (e.g., logical zero), the processor 106 and the power providing module 108 are in working mode. If the controlling signal is high level (e.g., logical one), the processor 106 and the power providing module 108 are in sleep mode.

In one embodiment, the voltage dividing module 114 includes a first dividing resistor R2, a second dividing resistor R3, a third dividing resistor R4, and a dividing capacitor C2. In one embodiment, the voltage dividing module 114 is connected to a first GPIO port and a second GPIO port, and receives a first logic signal and a second logic signal. The logic signals from the GPIO ports include high and floating.

One end of the first dividing resistor R2 receives the first logic signal from the first GPIO port. One end of the second dividing resistor R3 receives the second logic signal from the second GPIO port. Another end of the first dividing resistor R2 is connected to another end of the second dividing resistor R3 and then connected to one end of the dividing capacitor C2 and one end of the third dividing resistor R4. Another end of the dividing capacitor C2 is connected to the ground. Another end of the third dividing resistor R4 is connected to the emitter of the transistor Q1.

The controlling signal output by the power saving circuit 110 equals voltage on the dividing capacitor C2. If no voltage substantially exists on the dividing capacitor C2, the controlling signal outputs low level. If voltage exists on the dividing capacitor C2, the controlling signal outputs high level.

If the signal inputting module 112 can couple signals, the transistor Q1 is on. Therefore, voltage between the emitter and the collector of the transistor Q1 can be ignored. Difference between resistance of the second dividing resistor R3 and the third dividing resistor R4 may be designed to be very large. Consequently, voltage on the dividing capacitor C2 and on the third dividing resistor R4 can also be ignored. As such, the power saving circuit 110 outputs low level and the processor 106 and the power providing module 108 is in working mode. Conversely, if the signal inputting module 112 cannot couple signals, the transistor Q1 is off. As such, the power saving circuit 110 outputs high level and the processor 106 and the power providing module 108 is in sleep mode, which conserves power.

It is noted that the power saving circuit 110 is not limited to the structure shown in FIG. 2. The power saving circuit 110 can be changed to any suitable structure, such as, the relation between the controlling signal and the mode of the processor 106 and the power providing module 108 can be changed to other relations. The transistor Q1 can be changed to other elements. The connection between the transistor Q1 and the voltage dividing module 114 can be changed to other connections.

The network device 10 provided by embodiments of the present disclosure couples the displaying signals transmitted from the network module 104 to the status displaying module 102 using the power saving circuit 110 and controls modes of the processor 106 and the power providing module 108 according to the coupled signals. The network device 10 directs the processor 106 and the power providing module 108 to enter working mode upon the condition that the network device 10 processes and transmits the network data and sleep mode upon the condition that the network device 10 stops processing and transmitting the network data, which consequently conserves power.

While various embodiments of the present disclosure have been described above, it should be understood that they have been presented using example only and not using limitation. Thus the breadth and scope of the present disclosure should not be limited by the above-described embodiments, but should be defined only in accordance with the following claims and their equivalents.

What is claimed is:

1. A network device, comprising:
  a network module operable to implement network functions of the network device;
  a status displaying module operable to receive displaying signals from the network module, to indicate operating status of the network device using a plurality of displaying signal transmission lines connecting the network module and the status displaying module;
  a processor operable to direct the network module to implement the network functions;
  a power providing module operable to provide power for the processor, the network module, and the status displaying module; and
  a power saving circuit coupled to the plurality of displaying signal transmission lines connecting the network module and the status displaying module, and operable to couple the displaying signals transmitted to the status displaying module from the network module to obtain coupled signals and to control modes of the processor and the power providing module according to existence of the coupled signals, wherein the power saving circuit comprises:
  a signal inputting module operable to input the coupled signals;
  a transistor, wherein the base of the transistor is connected to the signal inputting module, the emitter of the transistor is connected to the ground, and the transistor is on upon the condition that the coupled signals are present and off upon the condition that no coupled signals are present; and
  a voltage dividing module operable to receive logic signals from general purpose input output (GPIO) ports of the network device, connected to the emitter of the transistor, operable to output a controlling signal according to the transistor and the logic signals so as to control modes of the processor and the power providing module, wherein the voltage dividing module comprises:
  a first dividing resistor operable to receive a first logic signal from a first GPIO port of the network device;
  a second dividing resistor operable to receive a second logic signal from a second GPIO port of the network device;
  a dividing capacitor, wherein one end of the dividing capacitor is connected to the first dividing resistor and the second dividing resistor, and another end of the dividing capacitor is connected to the ground; and
  a third dividing resistor, wherein one end of the third dividing resistor is connected to the first dividing resistor and the second dividing resistor, another end of the third dividing resistor is connected to the emitter of the transistor.

2. The network device as claimed in claim 1, wherein the power saving circuit directs the processor and the power providing module to enter a working mode upon the condition that the coupled signals are present.

3. The network device as claimed in claim 1, wherein the power saving circuit directs the processor and the power providing module to enter a sleep mode upon the condition that the coupled signals are not present.

4. The network device as claimed in claim 1, wherein the signal inputting module comprises a plurality of signal inputting lines which are respectively coupled to the plurality of displaying signal transmission lines connecting the network module and the status displaying module.

5. The network device as claimed in claim 4, wherein the coupled signals are present upon the condition that signals are present in any one of the signal inputting lines.

6. The network device as claimed in claim 1, wherein the processor and the power providing module are changed to enter sleep mode if the controlling signal output by the voltage dividing module is high level.

7. The network device as claimed in claim 1, wherein the processor and the power providing module are changed to enter working mode if the controlling signal output by the voltage dividing module is low level.

8. The network device as claimed in claim 1, wherein the first logic signal and the second logic signal comprise high level and floating.

9. The network device as claimed in claim 8, wherein the voltage dividing module outputs the controlling signal by one end of the first dividing resistor and the second dividing resistor which connected to the dividing capacitor and the third dividing resistor.

10. The network device as claimed in claim 1, wherein the network module is a physical layer of the Ethernet standard.

* * * * *